US012668035B2

(12) United States Patent
Chen et al.

(10) Patent No.: US 12,668,035 B2
(45) Date of Patent: Jun. 30, 2026

(54) METHOD FOR MANUFACTURING PAPER CONTAINER

(71) Applicant: TAIWAN CHEMWELL INDUSTRIAL CO., LTD., Changhua County (TW)

(72) Inventors: Hou-Ren Chen, Changhua County (TW); Ming-Zhou Chuang, Changhua County (TW); Hsin-Hung Chen, Changhua County (TW)

(73) Assignee: TAIWAN CHEMWELL INDUSTRIAL CO., LTD., Changhua County (TW)

( * ) Notice: Subject to any disclaimer, the term of this patent is extended or adjusted under 35 U.S.C. 154(b) by 0 days.

(21) Appl. No.: 19/011,979

(22) Filed: Jan. 7, 2025

(65) Prior Publication Data

US 2025/0249651 A1 Aug. 7, 2025

(30) Foreign Application Priority Data

Feb. 5, 2024 (TW) ................................ 113104499

(51) Int. Cl.

*B31B 50/64* (2017.01)
*B31B 50/14* (2017.01)
*B31B 50/74* (2017.01)
*B31B 110/20* (2017.01)
*B31B 120/10* (2017.01)

(52) U.S. Cl.

CPC .............. *B31B 50/64* (2017.08); *B31B 50/14* (2017.08); *B31B 50/747* (2017.08); *B31B 2110/20* (2017.08); *B31B 2120/10* (2017.08)

(58) Field of Classification Search

CPC ....... B31B 50/747; B31B 50/14; B31B 50/28; B31B 50/66; B31B 2110/10; B31B 2110/20; B31B 2120/40; B31B 2120/10; B31B 2105/0022

See application file for complete search history.

(56) References Cited

U.S. PATENT DOCUMENTS 3,164,314 A * 1/1965 Waycie .................... B65D 3/10 229/400
4,409,045 A * 10/1983 Busse ............... B29C 66/73921 156/499
4,546,911 A * 10/1985 Clauss ..................... B65D 3/22 493/379

(Continued)

*Primary Examiner* — Thomas M Wittenschlaeger
(74) *Attorney, Agent, or Firm* — MUNCY, GEISSLER, OLDS & LOWE, P.C.

(57) ABSTRACT

A method for manufacturing a paper container, including following steps: preparing a paper material; applying a covering layer to at least one surface of the paper material to form a base material, wherein a material of the covering layer is selected from a group including acrylic acid; cutting the base material to form a first sheet and a second sheet; bending and connecting the first sheet to form a barrel body; and connecting the second sheet with the barrel body by ultrasonic heating and pressing. The barrel body is circumferentially disposed around the second sheet, and surfaces of the barrel body and the second sheet facing each other respectively have the covering layer applied thereto. The paper container produced by the present invention is easy to recycle and manufacture, and is environmentally friendly and resistant to leakage.

8 Claims, 5 Drawing Sheets

(56) References Cited

U.S. PATENT DOCUMENTS

| | | | | | |
|---|---|---|---|---|---|
| 5,569,143 | A * | 10/1996 | Konzal | B31F 1/009 156/69 |
| 7,686,753 | B2 * | 3/2010 | Konzal | B31B 50/642 493/157 |
| 9,371,149 | B2 * | 6/2016 | Guo | B65D 3/14 |
| 10,415,188 | B1 * | 9/2019 | Knauf | D21H 19/84 |
| 11,718,059 | B2 * | 8/2023 | Olcese | B41M 3/006 156/256 |
| 2008/0026924 | A1 * | 1/2008 | Konzal | B31D 1/005 493/153 |
| 2014/0190638 | A1 * | 7/2014 | Hull | B29C 66/244 156/580.2 |
| 2015/0210443 | A1 * | 7/2015 | Sarson | B65D 3/268 220/592.2 |
| 2019/0084264 | A1 * | 3/2019 | Sallot | B31B 50/747 |
| 2019/0160776 | A1 * | 5/2019 | Olcese | B41M 3/006 |
| 2022/0111995 | A1 * | 4/2022 | Zhao | B65D 25/14 |
| 2025/0249651 | A1 * | 8/2025 | Chen | B31B 50/747 |

* cited by examiner

METHOD FOR MANUFACTURING PAPER CONTAINER

BACKGROUND OF THE INVENTION

Field of the Invention

The present invention relates to a method for manufacturing a paper container.

Description of the Prior Art

Conventional paper containers, such as paper cups, paper bowls, etc., are manufactured by coating a base paper with a film, then printing and cutting it to obtain fan-shaped paper pieces. Each fan-shaped piece is then rolled into a tubular cup body, and a die-cut cup bottom is heat-pressed and bonded to the cup body. Furthermore, in the known manufacturing process, the cup bottom is first placed inside the cup body, and then a portion of a bottom of the cup body is folded inward toward the cup bottom. Hot air is applied to this area to melt the coating layer, and a pressure is applied to bond the cup body with the cup bottom.

However, in the aforementioned method, there is a time gap between the heating and pressing steps, which causes the coating layer to partially cool and lose its adhesive properties. As a result, the cup body and the cup bottom cannot be effective bonded by embossing and pressing, leading to poor sealing of the paper cup and making it prone to leakage, especially when the coating material has a higher glass transition temperature. In addition, the commonly used coating material is polyethylene, which results in paper cups that are non-biodegradable, non-repulpable, and difficult to recycle.

The present invention is, therefore, arisen to obviate or at least mitigate the above-mentioned disadvantages.

SUMMARY OF THE INVENTION

The main object of the present invention is to provide a method for manufacturing a paper container, and the paper container is easy to manufacture and recycle, environmentally friendly, and has a good sealing effect.

To achieve the above and other objects, the present invention provides a method for manufacturing a paper container, including following steps: preparing a paper material; applying a covering layer to at least one surface of the paper material to form a base material, wherein a material of the covering layer is selected from a group including acrylic acid; cutting the base material to form a first sheet and a second sheet; bending and connecting the first sheet to form a barrel body; and connecting the second sheet with the barrel body by ultrasonic heating and pressing. The barrel body is circumferentially disposed around the second sheet, and surfaces of the barrel body and the second sheet facing each other respectively have the covering layer applied thereto. Said covering layers located between the barrel body and the second sheet are at least partially fused together by ultrasonic heating, while the barrel body and the second sheet are being embossed and pressed together.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 6 for a preferable embodiment of the present invention. A method for manufacturing a paper container of the present invention includes following steps.

Step S1: preparing a paper material 1. A material and a thickness of the paper material 1 are selected according to different production requirements.

Step S2: applying a covering layer 2 to at least one surface of the paper material 1 to form a base material 10. A material of the covering layer 2 is selected from a group including acrylic acid. In this embodiment, the material of the covering layer 2 includes a water-based acrylic acid resin so that the base material 10 provides waterproof and oil proof effects, and is recyclable and low cost. The covering layer 2 is distributed on the paper material 1 with a weight of 1 to 20 grams per square meter (GSM), preferably between 6 and 12 GSM, so that a thickness of the covering layer 2 is thin, reducing production costs and facilitating recycling. Specifically, the weight of the covering layer 2 refers to a weight of the material of the covering layer 2 after it has been applied to the paper material 1 and dried. Moreover, the material of the covering layer 2 may be applied to one or both sides of the paper material 1 using an existing coating machine, and the covering layer 2 may be applied either partially or completely to at least one side of the paper material 1.

The material of the covering layer 2 may further include at least one of ethylene propylene copolymer (EPP), ethylene acrylic acid copolymer emulsion (EAA), polypropylene carbonate (PPC), polybutylene adipate terephthalate (PBAT), polybutylene succinate polyester (PBS), polylactic acid (PLA), polyurethane (PU), polyhydroxyalkanoate (PHA), polyethylene terephthalate (PET) and polyethylene terephthalate-1, 4-cyclohexanedimethanol ester (PETG), which is selectable to use to adjust a property of the covering layer 2.

Figure 1:
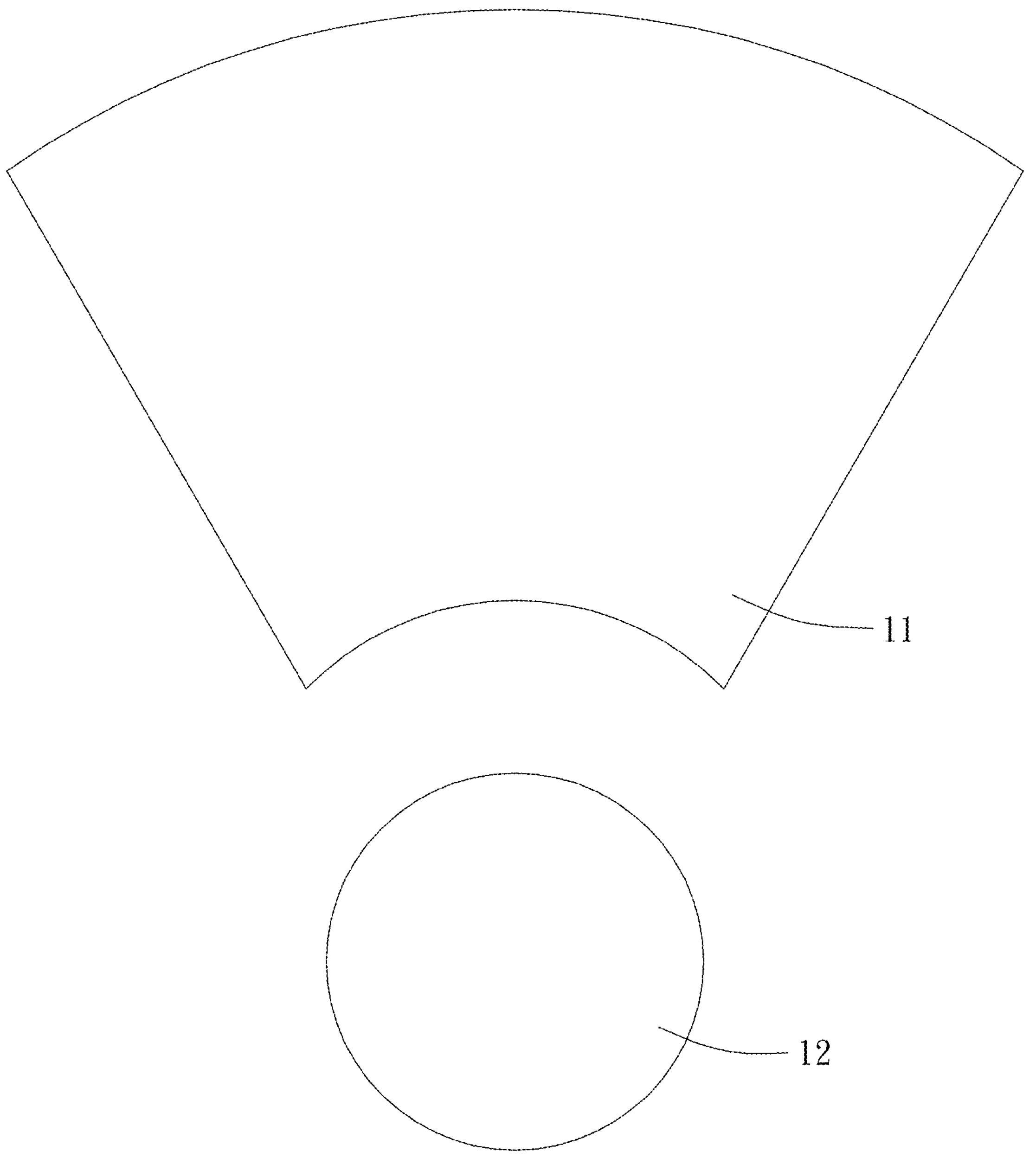
FIGS. 1-5 are drawings showing manufacturing processes of a preferable embodiment of the present invention.

Step S3: cutting the base material 10 to form a first sheet 11 and a second sheet 12, as shown in FIG. 1. If printing is required, it can be completed before step S3. Shapes and sizes of the first sheet 11 and the second sheet 12 are adjustable to meet different requirements.

Figure 2:
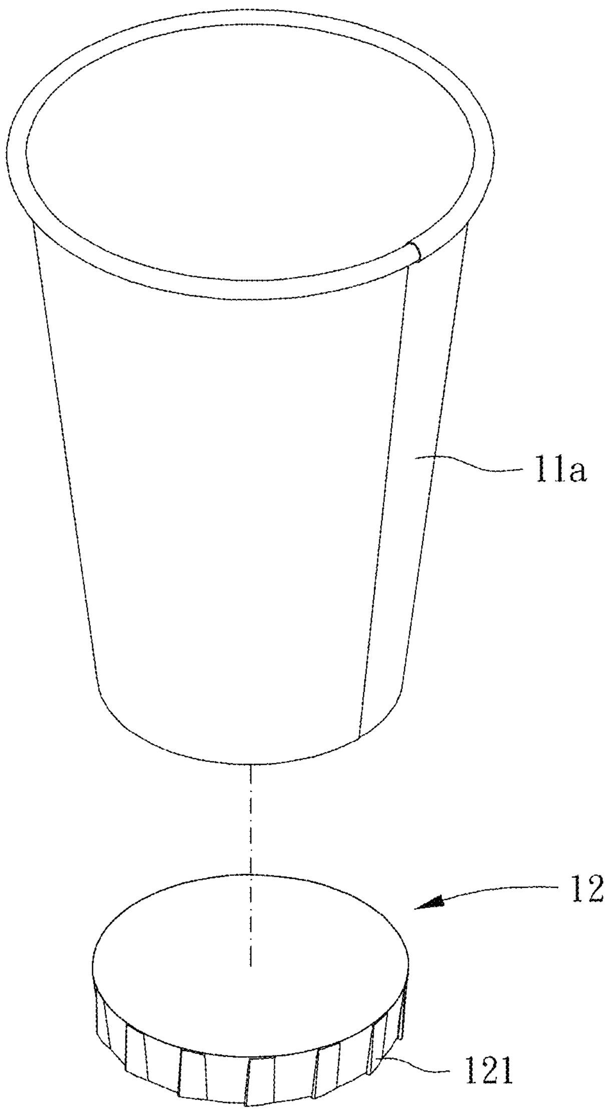
Figure 3:
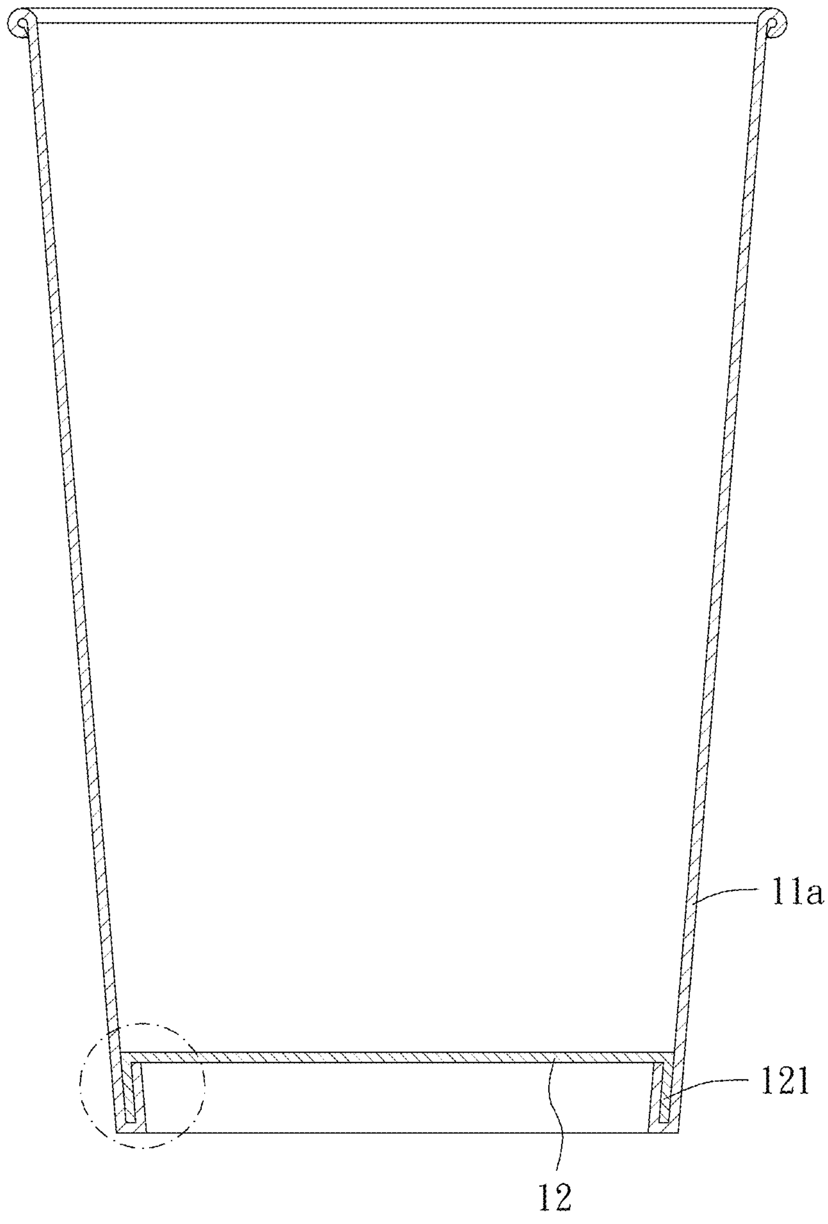

Step S4: bending and connecting the first sheet 11 to form a barrel body 11*a*, as shown in FIG. 2. Two ends of the first sheet 11 may be connected with each other by pressing and heating and through methods such as ultrasonic heating or hot air blowing, allowing said covering layers 2 to melt and fuse together.

Step S5: connecting the second sheet 12 with the barrel body 11*a* by ultrasonic heating and pressing. The barrel body 11*a* is circumferentially disposed around the second sheet 12, and surfaces of the barrel body 11*a* and the second sheet 12 facing each other respectively have the covering layer 2 applied thereto. Moreover, said covering layers 2 located between the barrel body 11*a* and the second sheet 12 are at least partially fused together by ultrasonic heating, while the barrel body 11*a* and the second sheet 12 are being embossed and pressed together. This effectively prevents the issue of insufficient bonding strength caused by partial cooling of the covering layer 2 after heating. Therefore, the barrel body 11*a* and the second sheet 12 are stably connected without leakage, and the method involves fewer processing steps, thereby increasing production capacity.

Figure 4:
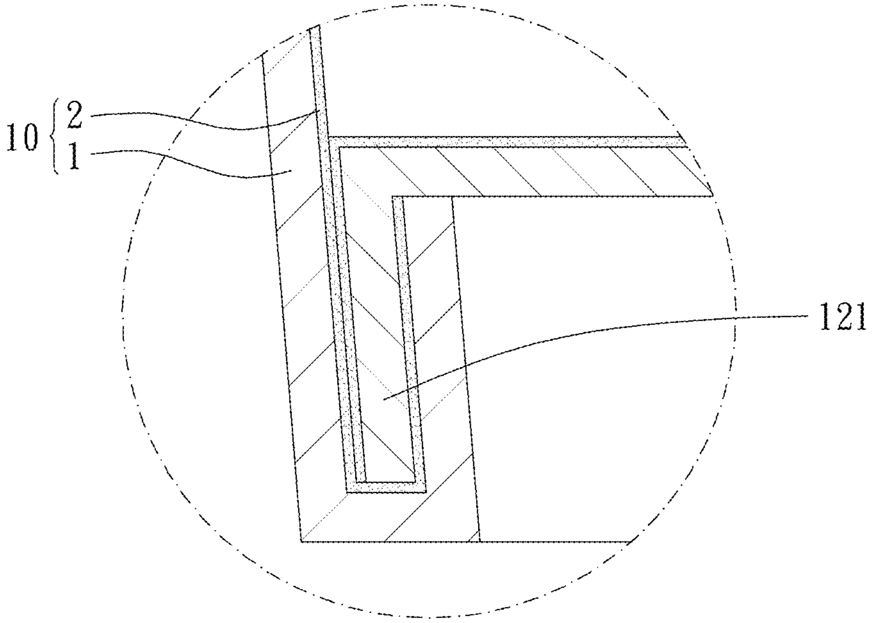
Figure 5:
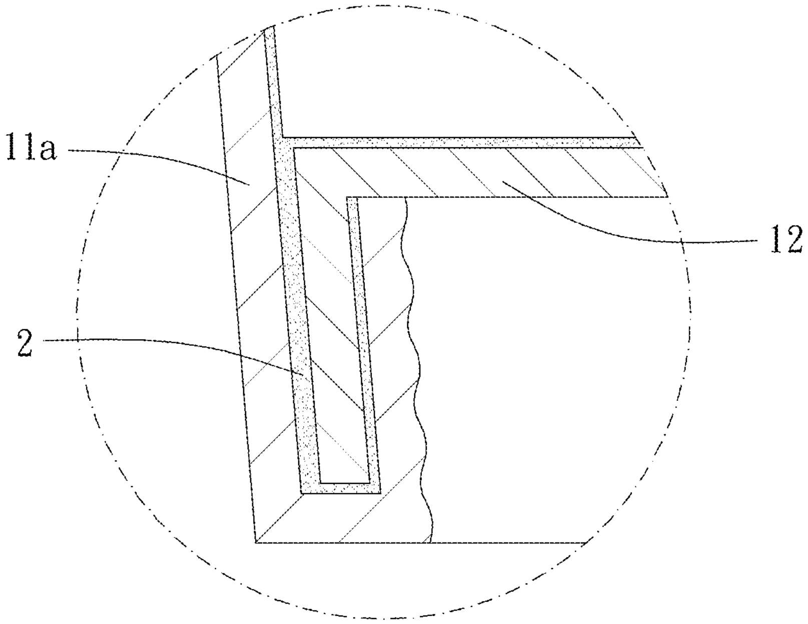
Figure 6:
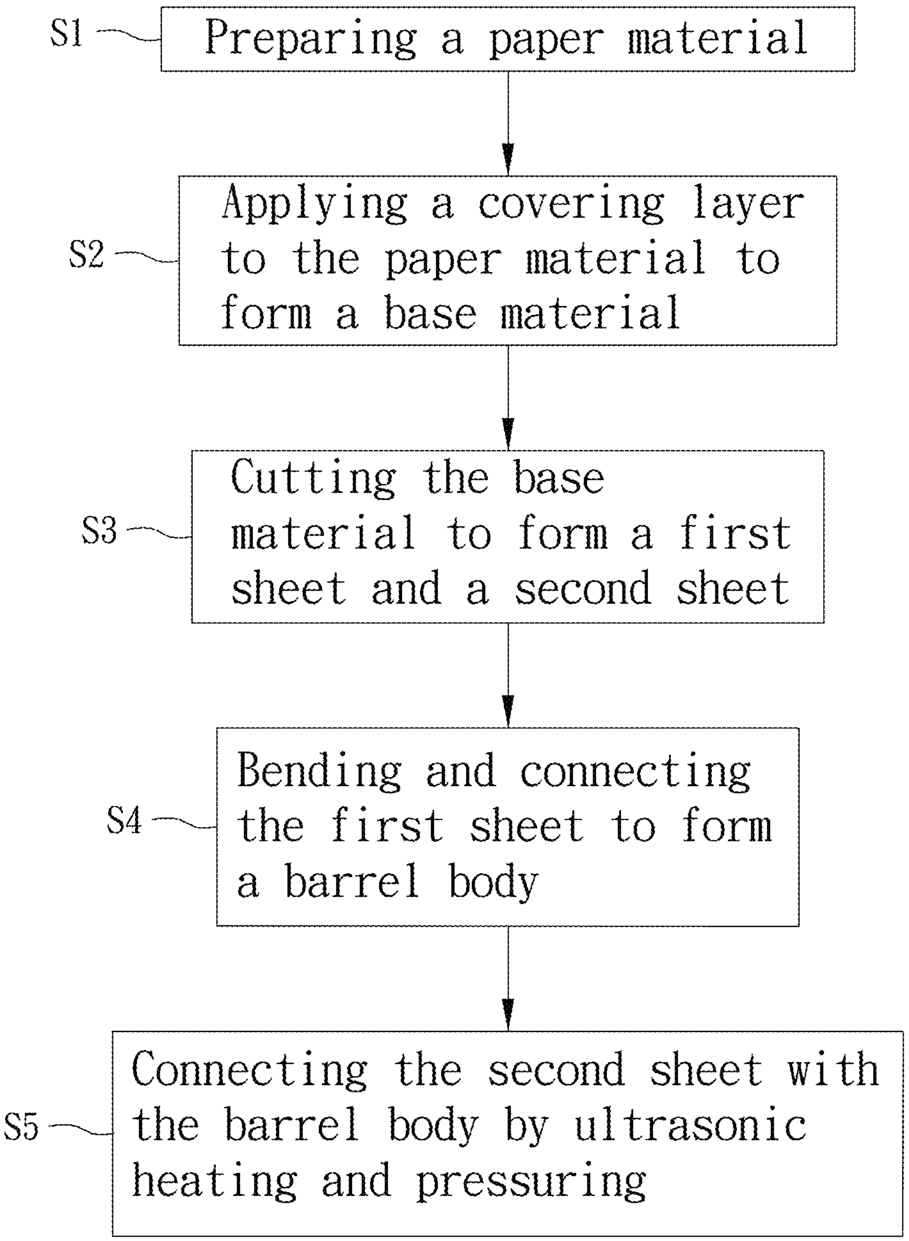
FIG. 6 is a flow chart of a preferable embodiment of the present invention.

Before the step S5, further bending and folding the second sheet 12 to formed an annular flange 121, positioning the annular flange 121 on an inner peripheral surface of the barrel body 11*a* in a predetermined position (as shown in FIG. 4), and preheating at least one of the barrel body 11*a* and the annular flange 121. A preheating temperature is between 140° C. and 400° C., and preferably higher than a glass transition temperature (Tg) of the material of the covering layer 2. Said covering layers 2 on the inner peripheral surface of the barrel body 11*a* and the annular flange 121 may be preheated by hot air blowing so that the covering layer 2 can quickly reach the melting temperature during ultrasonic heating.

Preferably, the glass transition temperature of the material of the covering layer 2 is higher than or equal to 30° C. so as to prevent the covering layer from becoming sticky at room temperature. A difference between the glass transition temperature and a melting temperature (Tm) of the material of the covering layer 2 is less than or equal to 20° C. Therefore, the material of the covering layer 2 can rapidly cool to the glass transition temperature after heating and melting in the step S5, allowing the barrel body 11*a* and the second sheet 12 to be stably connected with each other when a heat source is removed, and preventing said paper containers from sticking with one another when being stacked.

In this embodiment, the first sheet 11 is cut into a fan shape, and the barrel body 11*a* and the second sheet 12 are connected to form a cup body. In other embodiments, the first sheet may be cut into a rectangular shape, and the barrel body and the second sheet may be connected to form a cup lid, bowl or bucket.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for manufacturing a paper container, including:

preparing a paper material;

applying a covering layer to at least one surface of the paper material to form a base material, wherein a material of the covering layer is selected from a group including acrylic acid;

cutting the base material to form a first sheet and a second sheet;

bending and connecting the first sheet to form a barrel body; and connecting the second sheet with the barrel body by ultrasonic heating and pressing, wherein the barrel body is circumferentially disposed around the second sheet, and surfaces of the barrel body and the second sheet facing each other respectively have the covering layer applied thereto; said covering layers located between the barrel body and the second sheet are at least partially fused together by ultrasonic heating, while the barrel body and the second sheet are being embossed and pressed together;

wherein a difference between a glass transition temperature (Tg) and a melting temperature (Tm) of the material of the covering layer is less than or equal to 20° C.

2. The method for manufacturing the paper container of claim 1, wherein the material of the covering layer further includes at least one of ethylene propylene copolymer (EPP), ethylene acrylic acid copolymer emulsion (EAA), polypropylene carbonate (PPC), polybutylene adipate terephthalate (PBAT), polybutylene succinate polyester (PBS), polylactic acid (PLA), polyurethane (PU), polyhydroxyalkanoate (PHA), polyethylene terephthalate (PET) and polyethylene terephthalate-1, 4-cyclohexanedimethanol ester (PETG).

3. The method for manufacturing the paper container of claim 1, wherein the material of the covering layer includes a water-based acrylic acid resin, and the covering layer is distributed on the paper material 1 with a weight of 1 to 20 grams per square meter (GSM).

4. The method for manufacturing the paper container of claim 1, further including following steps of: bending and folding the second sheet to form an annular flange, positioning the annular flange on an inner peripheral surface of the barrel body in a predetermined position, and preheating at least one of the barrel body and the annular flange.

5. The method for manufacturing the paper container of claim 4, wherein a preheating temperature is between 140° C. and 400° C.

6. The method for manufacturing the paper container of claim 1, wherein the first sheet is cut into a fan shape, and the barrel body and the second sheet are connected to form a cup body.

7. The method for manufacturing the paper container of claim 1, wherein the first sheet is cut into a rectangular shape, and the barrel body and the second sheet are connected to form a cup lid.

8. The method for manufacturing the paper container of claim 1, wherein the glass transition temperature of the material of the covering layer is higher than or equal to 30° C.

* * * * *